(12) United States Patent
Sweatlock et al.

(10) Patent No.: US 8,749,866 B2
(45) Date of Patent: Jun. 10, 2014

(54) PLASMONIC MODULATOR INCORPORATING A SOLID-STATE PHASE CHANGE MATERIAL

(75) Inventors: Luke Sweatlock, Hawthorne, CA (US); Kenneth Diest, Burlington, MA (US); James Ma, Redondo Beach, CA (US); Vladan Jankovic, Los Angeles, CA (US); Imogen Pryce, Santa Monica, CA (US); Ryan Briggs, Pasadena, CA (US); Harry Atwater, South Pasadena, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 13/327,298

(22) Filed: Dec. 15, 2011

(65) Prior Publication Data

US 2013/0155484 A1     Jun. 20, 2013

(51) Int. Cl.
*G02F 1/065*     (2006.01)
*B82Y 20/00*     (2011.01)

(52) U.S. Cl.
CPC ............ *B82Y 20/00* (2013.01); *G02F 1/065* (2013.01); *G02F 2203/10* (2013.01)
USPC ............................................. 359/245; 385/8

(58) Field of Classification Search
USPC .............. 359/237–324, 900; 385/1–11; 216/2
See application file for complete search history.

(56) References Cited

U.S. PATENT DOCUMENTS

| | | | |
|---|---|---|---|
| 3,484,722 A | 12/1969 | Barker et al. | |
| 4,084,130 A * | 4/1978 | Holton | 372/50.1 |
| 4,283,113 A | 8/1981 | Eden | |
| 5,608,568 A | 3/1997 | Blodgett et al. | |
| 5,783,844 A | 7/1998 | Kobayashi et al. | |
| 6,265,708 B1 | 7/2001 | Tanaka et al. | |
| 6,790,697 B2 | 9/2004 | Kobayashi et al. | |
| 6,898,359 B2 * | 5/2005 | Soljacic et al. | 385/123 |

(Continued)

FOREIGN PATENT DOCUMENTS

| | | |
|---|---|---|
| WO | WO 2005/092286 A3 | 10/2005 |
| WO | WO 2008/019970 A1 | 10/2008 |

OTHER PUBLICATIONS

Dionne, et al.: *"PlasMOStor: A Metal-Oxide-Si Field Effect Plasmonic Modulator"*; Nano Letters, ACS Publications; American Chemical Society; downloaded from https://pubs.acs.org on Jan. 27, 2009.

(Continued)

*Primary Examiner* — Darryl J Collins
*Assistant Examiner* — Gary O'Neill
(74) *Attorney, Agent, or Firm* — Tarolli, Sundheim, Covell & Tummino LLP (57) ABSTRACT

Systems and methods are provided for modulating light of a wavelength of interest. The modulator assembly includes a plasmonic layer that supports surface plasmon polaritons at the wavelength of interest and a layer of solid-state phase change material having a first phase in which it is substantially transparent to light of the wavelength of interest and a second phase in which it is substantially opaque to light of the wavelength of interest. A control mechanism is configured to alter the phase of the solid-state phase change material between the first phase and the second phase. Each of the plasmonic layer and the layer of solid-state phase change material are configured as to provide a plasmonic mode of transmission for light of the wavelength of interest.

23 Claims, 7 Drawing Sheets

(56) References Cited

U.S. PATENT DOCUMENTS

| | | | |
|---|---|---|---|
| 6,992,826 B2* | 1/2006 | Wang | 359/585 |
| 7,426,322 B2 | 9/2008 | Hyde | |
| 7,466,420 B2 | 12/2008 | Hyde | |
| 7,532,790 B2 | 5/2009 | Smith et al. | |
| 7,693,363 B2 | 4/2010 | Dionne et al. | |
| 7,755,825 B1* | 7/2010 | Padilla et al. | 359/237 |
| 7,772,094 B2 | 8/2010 | Nandakumar et al. | |
| 2003/0002156 A1* | 1/2003 | Hobbs et al. | 359/573 |
| 2008/0170982 A1 | 7/2008 | Zhang et al. | |
| 2009/0034055 A1 | 2/2009 | Gibson | |
| 2009/0052827 A1* | 2/2009 | Durfee et al. | 385/2 |
| 2009/0180731 A1 | 7/2009 | Christensen et al. | |
| 2009/0273820 A1 | 11/2009 | Dionne et al. | |
| 2010/0309539 A1* | 12/2010 | Kaye et al. | 359/288 |
| 2011/0109659 A1 | 5/2011 | Tang et al. | |
| 2011/0166045 A1* | 7/2011 | Dhawan et al. | 506/39 |
| 2011/0170160 A1 | 7/2011 | Park et al. | |
| 2011/0285942 A1* | 11/2011 | Guo et al. | 349/96 |

OTHER PUBLICATIONS

Dicken et al.: "*Electrooptic Modulation in Thin Film Barium Titanate Plasmonic Interferometers*"; Nano Letters, vol. 8, No. 11; American Chemical Society; downloaded from https://pubs.acs.ord on Nov. 17, 2008; pp. 4048-4052.

Dicken, et al. 2: "*Frequency Tunable Near-Infrared Metamaterials Based on $VO_2$ Phase Transition*"; Optics Express, Sep. 28, 2009; vol. 17, No. 20; pp. 18330-18339.

Dionne et al. 2: "*Silicon-Based Plasmonics for On-Chip Photonics*"; IEEE Journal of Selected Topics in Quantum Electronics, vol. 16, No. 1, Jan./Feb. 2010; pp. 295-306.

Driscoll, et al.: "*Dynamic Tuning of an Infrared Hybrid-Metamaterial Resonance Using Vanadium Dioxide*"; Applied Physics Letters 93, 024101 (2008).

MacDonald, et al.: "*Active Plasmonics: Current Status*"; Laser & Photon. Reg., 1-6 (2009)/ DOI 10.1002/lpor.200900035.

Livage: "*Optical and Electrical Properties of Vanadium Oxides Synthesized from Alkoxides*"; Coordination Chemistry Reviews, vol. 190-192, 1999, retrieved on Jan. 9, 2013 from the internet at: http://www.udel.edu/chem/polenova/PDF/Polyoxometalates/Vanadium_oxides_opt_el_CoordChemRev1999.pdf, pp. 391-403.

Kyratsi, et al: *KSb5S8: A Wide Bandgap Phase-Change Material for Ultra High Density Rewrittable Information Storage:*, Advanced Materials, vol. 15, No. 17, Sep. 3, 2003, Retrieved on Jan. 9, 2013 from the internet at: http://www.cem.msu.edu/~kanatzid/Reprints/KSb5S8_Adv_Mat.pdf, pp. 1428-1431.

Afonso, et al.: "*Ultrafast Reversible Phase Change in GeSb Films for Erasable Optical Storage*", Applied Physics Letters, vol. 60, No. 25, Jun. 22, 1992, Retrieved on Jan. 9, 2013 from the internet at: http://digital.csic.ed/bitstream/10261/61605/1/Afonso.pdf, pp. 3123-3125.

International Search Report for corresponding PCT/US2012/065571, completed Jan. 9, 2013, by Blaine R. Copenheaver.

\* cited by examiner

PLASMONIC MODULATOR INCORPORATING A SOLID-STATE PHASE CHANGE MATERIAL

TECHNICAL FIELD

The present invention relates generally to nanophotonics, and more particularly to a plasmonic modulator incorporating a solid-state phase change material.

BACKGROUND OF THE INVENTION

The use of plasmonic components offers a unique opportunity for addressing the size mismatch between electrical and optical components. Plasmonic devices convert optical signals into surface electromagnetic waves propagating along metal-insulator interfaces. Because surface plasmons exhibit extremely small wavelengths and high local field intensities, optical confinement can scale to deep subwavelength dimensions in plasmonic structures.

SUMMARY OF THE INVENTION

In accordance with an aspect of the present invention, a nanoscale plasmonic modulator assembly is provided for modulating light of a wavelength of interest. The modulator assembly includes a metallic layer that is substantially opaque to light of the wavelength of interest and a layer of solid-state phase change material having a first phase in which it is substantially transparent to light of the wavelength of interest and a second phase in which it is substantially opaque to light of the wavelength of interest. A control mechanism is configured to alter the phase of the solid-state phase change material between the first phase and the second phase. Each of the metallic plasmonic layers and the layer of solid-state phase change material are configured as to provide a plasmonic mode of transmission for light of the wavelength of interest.

In accordance with another aspect of the present invention, fabrication methods are provided for realizing the required material layer stacks to produce a nanoscale plasmonic modulator. A solid-state phase change material is deposited on a first substrate. A first plasmonic layer is deposited on the solid-state phase change material, such that the solid-state phase change material is substantially covered by the first plasmonic layer. A second plasmonic layer is deposited on a second substrate. The first substrate is bonded to the second substrate, such that the first plasmonic layer is joined to the second plasmonic layer. Substantially all of the first substrate is etched away to expose the solid-state phase change material.

In accordance with yet another aspect of the present invention, a nanoscale plasmonic modulator assembly is provided for modulating light of a wavelength of interest. The modulator assembly includes a plasmonic layer that is substantially opaque to light of the wavelength of interest, a dielectric layer that is substantially transparent to light of the wavelength of interest, and a layer of vanadium oxide. A control mechanism is configured to alter the phase of the vanadium oxide between a metallic phase and an insulator phase. Each of the plasmonic layer, the dielectric layer, and the layer of vanadium oxide are configured as to provide a plasmonic mode of transmission for light of the wavelength of interest.

DETAILED DESCRIPTION OF INVENTION

In accordance with an aspect of the present invention, plasmonic waveguide devices are used, to modulate the propagation of light. Since the waveguide is often partially metallic, the light is in the form of propagating surface-plasmon polaritons ("SPPs" or "plasmons"). Waveguide configurations of interest include metal-insulator-metal (MIM) SPPs, insulator-metal-insulator (IMI) SPPs, channel and groove SPPs, and hybrid metal-insulator rib waveguides with subdiffraction limit mode confinement. It will be appreciated that the metallic layers are selected for the ability to support surface-plasmon polaritons, and may therefore be referred to as "plasmonic" material layers. It will be appreciated that a "plasmonic layer," as used herein, is not limited to metals, and can be formed from non-metallic materials. The plasmonic approach described herein allows for a large degree of confinement of light within the modulator, enabling significantly greater integration density and lower power consumption in optoelectronic circuits. Additionally, nanoscale switches allow for control of light in systems which already contain intrinsically nanoscale elements, such as single photon emitters or single molecule detectors. Accordingly, nanoscale plasmonic waveguides in accordance with the present invention can be used in 1×1 (on/off) switches, directional couplers, 1×N (output multiplexing) switches, data rate optical modulators, and dynamic color filters.

To provide for the switching effect, the waveguides described herein include a material which can transition between two phases in the solid state, referred to herein as "solid-state phase change materials." One example of such a transition is the metal-to-insulator transition in vanadium oxide ($VO_2$). The use of these materials allows the plasmonic modulators disclosed herein to provide a fast switching speed with minimal power consumption, while providing a very large change in optical properties of the modulator when the solid-state phase change material transitions between the two states. Accordingly, the plasmonic modulator provides both large confinement of the optical mode (reducing the cross section) and a very strong modulation action (reducing the length or "footprint"), making the plasmonic modulators disclosed herein ideal for large scale integration. The following description provides several modes of operation for such plasmonic modulators including index (phase) modulation, amplitude modulation, and waveguide mode cutoff.

Figure 1:
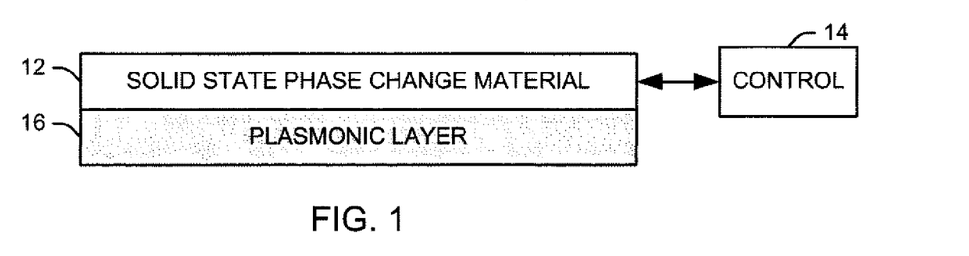
FIG. 1 is a schematic illustration of a nanoscale plasmonic modulator assembly in accordance with an aspect of the present invention.

FIG. 1 is a schematic illustration of a nanoscale plasmonic modulator assembly 10 in accordance with an aspect of the present invention. The illustrated modulator 10 is configured to modulate light of a wavelength of interest within a waveguide by altering an associated phase of a layer of solid-state phase change material 12 as to change the available modes of propagation for light of the wavelength of interest through the modulator 10. For example, the solid-state phase change material 12 can include vanadium oxide or any of a number of chalcogenide films, such as $Ge_2Sb_2Te_5$. The solid-state phase change material 12 can be transitioned between an insulator phase, in which it is substantially transparent to light of the wavelength of interest, and a metallic phase, in which it is substantially opaque for light of the wavelength of interest, via an appropriate control mechanism 14. For example, the control mechanism 14 can be configured to provide one or more of heat, light, electrical current, or an electrical or magnetic field to the layer of solid-state phase change material 12 to produce a change in the phase of the material. In one implementation, the control mechanism 14 uses thermal switching and includes appropriate elements for heating or cooling layer of solid-state phase change material 12.

The modulator assembly 10 further comprises a plasmonic layer 16 that is substantially opaque to light of the wavelength of interest. The plasmonic layer 16 has a high-enough electron density and appropriate electron configuration to support surface plasmons. For example, the plasmonic layer 16 can comprise silver, gold, indium tin oxide, or any other substance having a high level of reflectivity at the wavelength of interest. In accordance with an aspect of the present invention, the plasmonic layer 16 and the layer of solid-state phase change material 12 are configured as to provide a plasmonic mode of transmission for light of the wavelength of interest, with the plasmonic mode having an associated wavelength significantly less than the wavelength of interest. For example, the layer of solid-state phase change material 12 can be spatially proximate to the plasmonic layer 16, such that when the solid-state phase change material is in its insulator state, the transmission of surface-plasmon polaritons can occur along the metal-insulator interface for light of the wavelength of interest, but this mode of transmission is not available when the solid-state phase change material assumes its metallic phase. Alternatively, the modulator assembly 10 can include a dielectric layer (not shown) formed from an insulator such as silicon dioxide or sapphire, with the plasmonic layer 16, the dielectric layer, and the layer of solid-state phase change material 12 being configured to form a waveguide arrangement having at least one plasmonic mode.

Figure 2:
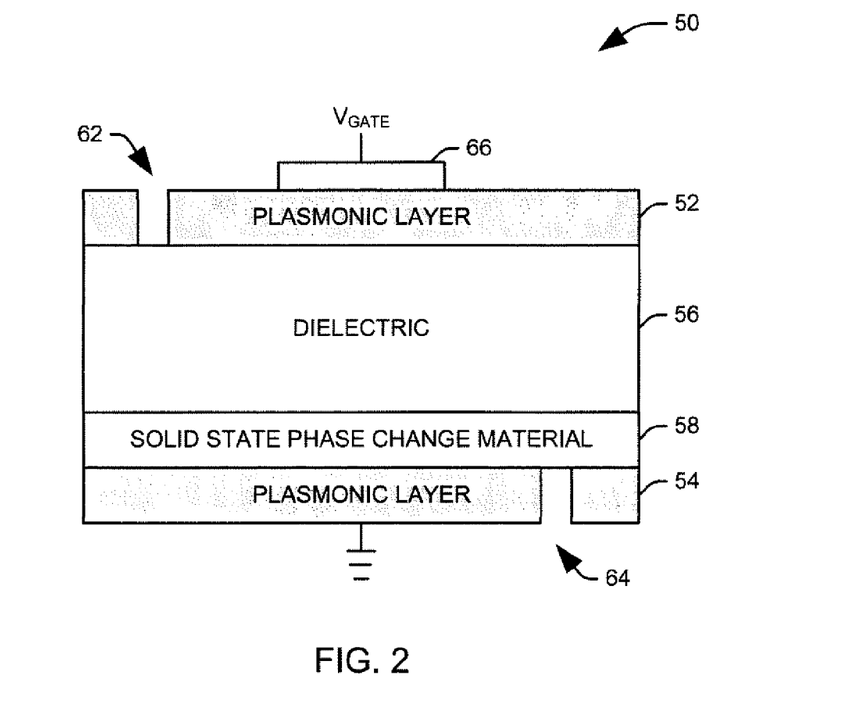
FIG. 2 illustrates a first example of a plasmonic modulator assembly in accordance with an aspect of the present invention.

FIG. 2 illustrates a first example of a plasmonic modulator assembly 50 in accordance with an aspect of the present invention. The plasmonic modulator assembly 50 is implemented as a four-layer waveguide, comprising two outer layers of plasmonic cladding 52 and 54, a dielectric layer 56, and a layer of solid-state phase change material 58. These layers 52, 54, 56, and 58 are substantially parallel to one another and are configured to allow light around a wavelength of interest to propagate through the waveguide. In the illustrated implementation, the layers of plasmonic cladding 52 and 54 are formed from silver, the dielectric layer 56 is formed from sapphire, and the solid-state phase change material 58 is vanadium dioxide ($VO_2$). In the illustrated implementation, the layer of vanadium oxide 58 has a width of fifty nanometers and the layer of sapphire 56 has a width of five hundred nanometers.

Subwavelength slits 62 and 64 are etched into the top and bottom cladding layer, with light coupled into and out of the modulator assembly 50 via the subwavelength slits 62 and 64, using one slit (e.g., 62) as an optical source and the other (e.g., 64) as an optical drain. It will be appreciated, however, that this is only one way of implementing the source and drain of the modulator assembly, and that the source and drain can be positioned essentially arbitrarily according to a desired configuration of the device.

In accordance with an aspect of the present invention, an associated phase of the layer of solid-state phase change material 58 can be controlled via an appropriate control mechanism 66. In the illustrated implementation, the control mechanism 66 can include appropriate circuitry, for example, on a surface of a first layer of plasmonic cladding 52, for applying an electrical field to the vanadium oxide to produce a change in its phase, but it will be appreciated that the control mechanism could instead comprise appropriate circuitry for directly heating the vanadium oxide, an ultrafast optical pumping assembly or a similar arrangement. When no field is being applied, the solid-state phase change material 58 remains in an insulator state, such that an insulator-metal interface is present between the layer of solid-state phase change material 58 and the silver cladding. Once a field is applied, the layer of solid-state phase change material 58 rapidly transitions to a metallic state, in which this interface is absent.

Figure 3:
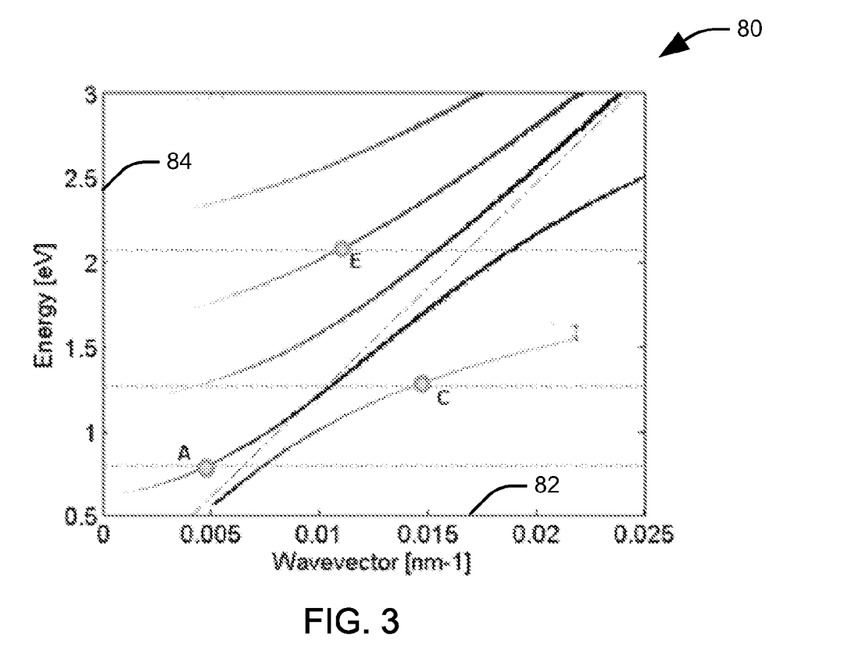
FIG. 3 is a diagram illustrating the allowable modes that characterize the plasmonic modulator assembly of FIG. 2 when the solid-state phase change material is in the insulating phase.
Figure 4:
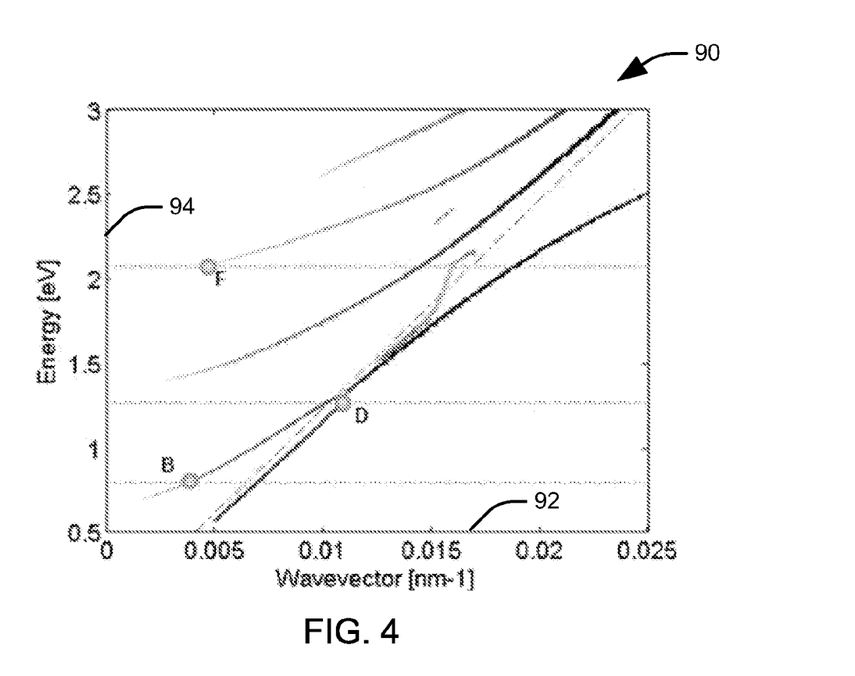
FIG. 4 is a diagram illustrating the allowable modes that characterize the plasmonic modulator assembly of FIG. 2 when the solid-state phase change material is in the metallic phase.

FIG. 3 is a diagram 80 illustrating the allowable modes that characterize the plasmonic modulator assembly of FIG. 2 when the solid-state phase change material is in the insulating phase. FIG. 4 is a diagram 90 illustrating the allowable modes that characterize the plasmonic modulator assembly of FIG. 2 when the solid-state phase change material is in the metallic phase. The assembly of FIG. 2 requires specific fabrication procedures to obtain, and one suitable fabrication strategy is described below in the discussion of FIG. 11-18. In FIGS. 3 and 4, the modal properties were calculated via a numerical solution of Maxwell's equations in steady state conditions. In the diagrams 80 and 90, the horizontal axes 82 and 92 represent the wavenumber, expressed in inverse nanometers, and the vertical axes 84 and 94 represent energy, in electron volts. The dark grey curves correspond to dispersion relation solutions, and as a result, each curve represents a distinct optical mode that can be supported within the device. Also, by changing the thickness of the layer of solid-state phase change material, here vanadium dioxide, and any other materials between the plasmonic layers and air, the positions of the curves can be shifted to exist at different wavelengths. In other words, changing layer thickness can be used to select the wavelength of light having a desired plasmonic mode or plasmonic response, or to "tune" the device to support a plasmonic mode or plasmonic response at a selected wavelength. This feature of the proposed device is true for all of the structures proposed.

Of particular interest in this diagram is the pair of points A and B, representing the transmission of light having a free space wavelength of 1550 nanometers, propagating in the form of a fundamental ("TM1") photonic mode. The mode of operation is summarized in Table 1, below, and is best illustrated by the 22% difference in mode index between point A and point B. Strong index modulation is also observed at another operating wavelength which is indicated by the pair of points C and D, representing the transmission of light having a free space wavelength of 980 nanometers, propagating in the form of a surface plasmon polariton (SPP) mode. Finally, a distinct mode of operation is indicated by the pair of points E and F, representing the transmission of light having a free space wavelength of 600 nanometers, propagating in the form of a higher order ("TM3") photonic mode. When the device is activated, this mode is greatly attenuated to the point of critically damping the propagation of energy in the device. This is referred to as driving the mode "into cutoff". Under these operating conditions, the device can be used as an attenuation modulator with an on/off ratio of 9 dB.

TABLE 1

| | Operating Point ($\lambda_o$) | Mode Type | Mode Index ($c*k_R/\omega$) | Quality Figure |
|---|---|---|---|---|
| A | 1550 nm | TM1 | 1.23 | 19 |
| B | 1550 nm | TM1 | 0.96 | 7.2 |
| C | 980 nm | SPP | 2.21 | 4.2 |
| D | 980 nm | SPP | 1.68 | 19 |
| E | 600 nm | TM3 | 1.03 | 9.7 |
| F | 600 nm | TM3 | 0.41 | 1.2 |

In Table 1 and subsequent tables, c represents the speed of light in a vacuum, $k_R$ is a real part of the wavenumber, $k_I$ is an imaginary part of the wavenumber, $\lambda_0$ is a wavelength of operation, and $\omega$ is the angular frequency ($2\pi/\lambda_o$).

Figure 5:
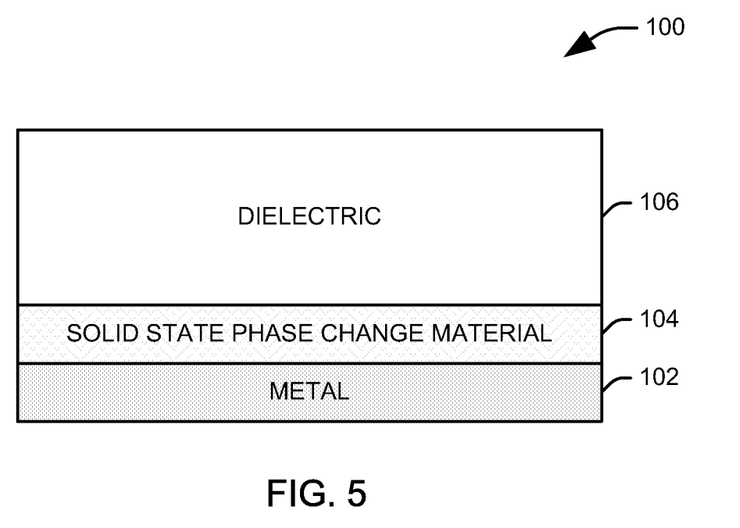
FIG. 5 illustrates one implementation of a variation of a plasmonic modulator assembly.
Figure 6:
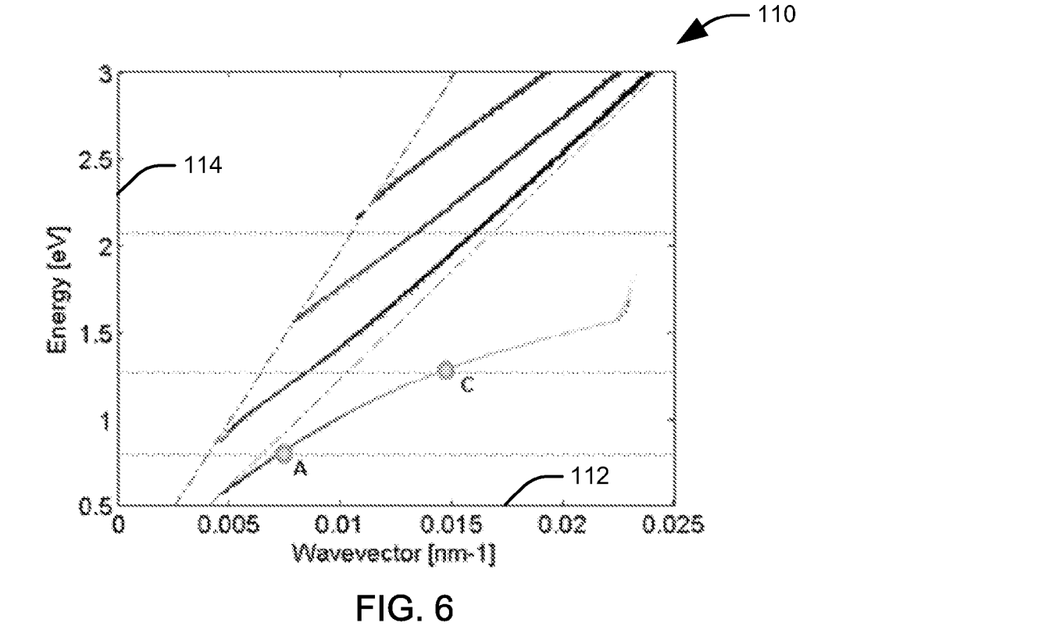
FIG. 6 is a diagram illustrating the allowable modes that characterize the plasmonic modulator assembly of FIG. 5 when the solid-state phase change material is in the insulating phase.
Figure 7:
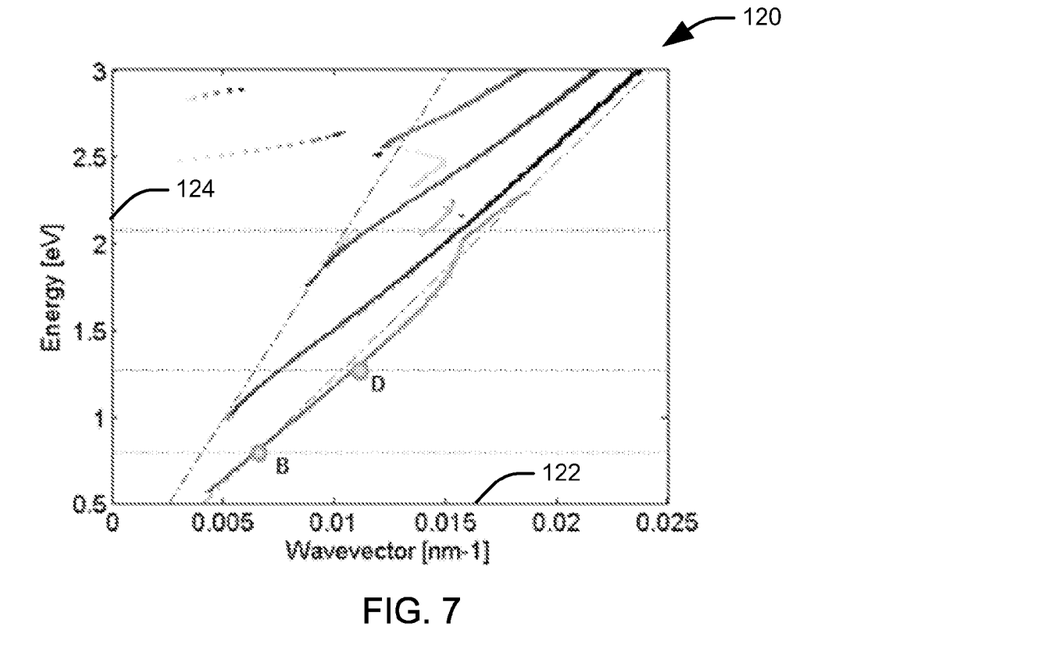
FIG. 7 is a diagram illustrating the allowable modes that characterize the plasmonic modulator assembly of FIG. 5 when the solid-state phase change material is in the metallic phase.

FIGS. 5-7 illustrate the allowable modes that characterize another variation of the plasmonic modulator assembly. FIG. 5 illustrates one implementation of this variation of a plasmonic modulator assembly 100. This plasmonic assembly comprises a silver substrate 102, a 50 nm thick layer of vanadium dioxide 104, a 500 nm thick layer of a transparent insulator such as sapphire 106, and a top cladding layer consisting of air 108. FIG. 6 is a diagram 110 illustrating the allowable modes that characterize the plasmonic modulator assembly of FIG. 5 when the vanadium dioxide is in the insulating phase. FIG. 7 is a diagram 120 illustrating the allowable modes that characterize the plasmonic modulator assembly of FIG. 5 when the vanadium dioxide is in the metallic phase. The illustrated modal properties were calculated via a numerical solution of Maxwell's equations in steady state conditions, with the horizontal axes 112 and 122 represent the wavenumber, expressed in inverse nanometers, and the vertical axes 114 and 124 represent energy, in electron volts.

Of particular interest in this diagram is the pair of points A and B, representing the transmission of light having a free space wavelength of 1550 nanometers, propagating in the form of a surface plasmon polariton (SPP) mode. The mode of operation is summarized in Table 2, below, and is best illustrated by the 10% difference in mode index between point A and point B. A key feature of this operating condition is that the device supports only a single mode at this wavelength. Even stronger index modulation is observed at another operating wavelength which is indicated by the pair of points C and D, representing the transmission of light having a free space wavelength of 980 nanometers, propagating in the form of a surface plasmon polariton (SPP) mode.

TABLE 2

| | Operating Point ($\lambda_o$) | Mode Type | Mode Index ($c*k_R/\omega$) | Quality Figure |
|---|---|---|---|---|
| A | 1550 nm | SPP | 1.78 | 21 |
| B | 1550 nm | SPP | 1.60 | 18 |
| C | 980 nm | SPP | 2.21 | 4.2 |
| D | 980 nm | SPP | 1.70 | 12 |

Figure 8:
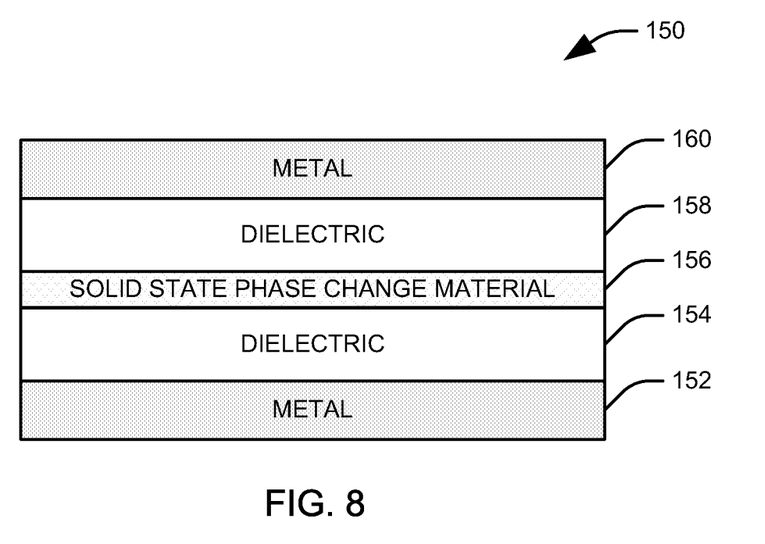
FIG. 8 illustrates one implementation of another variation of a plasmonic modulator assembly.
Figure 9:
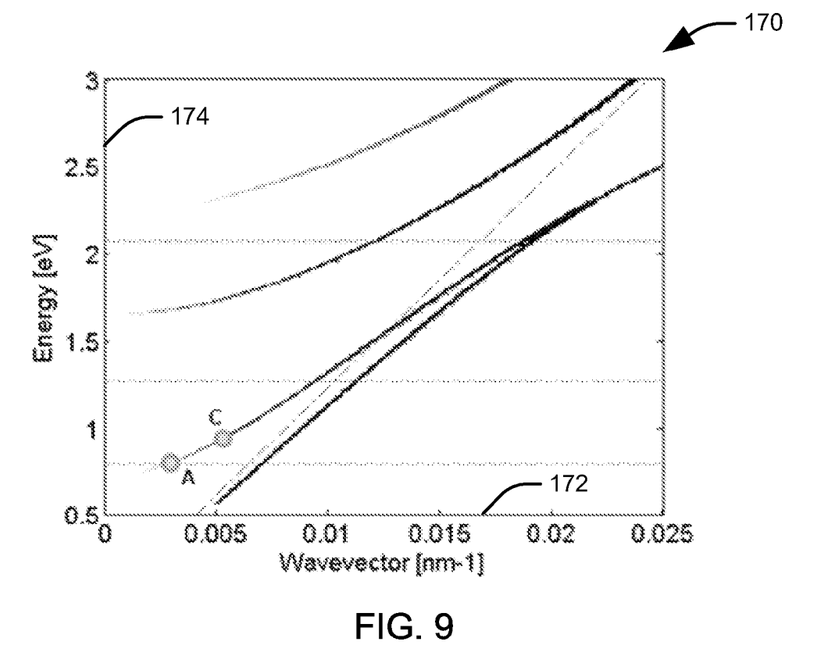
FIG. 9 is a diagram illustrating the allowable modes that characterize the plasmonic modulator assembly of FIG. 8 when the solid-state phase change material is in the insulating phase.
Figure 10:
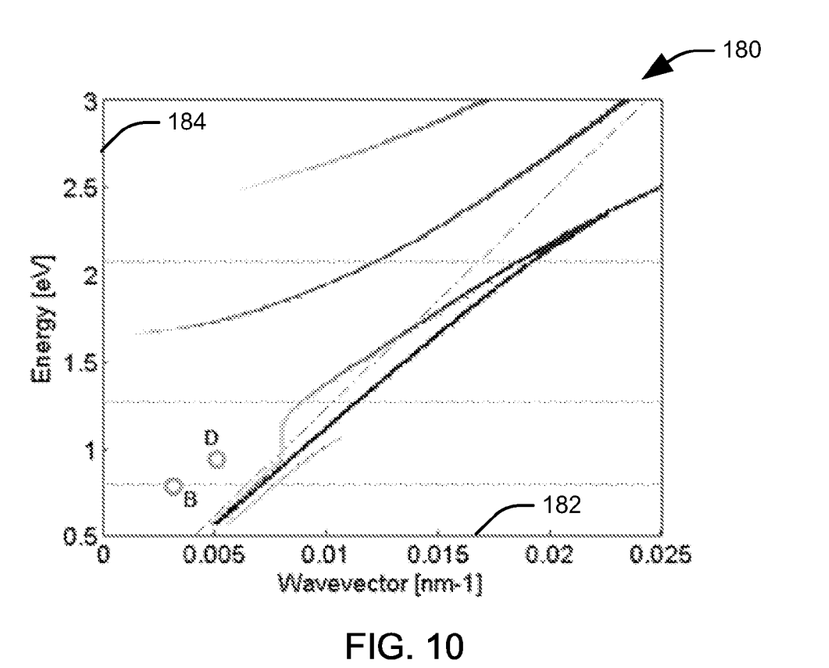
FIG. 10 is a diagram illustrating the allowable modes that characterize the plasmonic modulator assembly of FIG. 8 when the solid-state phase change material is in the metallic phase.

FIGS. 8-10 illustrate the allowable modes that characterize another variation of the plasmonic modulator assembly. FIG. 5 illustrates one implementation of this variation of a plasmonic modulator assembly 150. The illustrated plasmonic assembly comprises a silver substrate 152, a 200 nm thick layer of a transparent insulator 154, such as sapphire, a 20 nm thick layer of vanadium dioxide 156, another 200 nm thick layer of sapphire 158, and a top cladding layer 160 of silver. FIG. 9 is a diagram 170 illustrating the allowable modes that characterize the plasmonic modulator assembly of FIG. 8 when the vanadium dioxide is in the insulating phase. FIG. 10 is a diagram 180 illustrating the allowable modes that characterize the plasmonic modulator assembly of FIG. 8 when the vanadium dioxide is in the metallic phase. The illustrated modal properties were calculated via a numerical solution of Maxwell's equations in steady state conditions, with the horizontal axes 172 and 182 represent the wavenumber, expressed in inverse nanometers, and the vertical axes 174 and 184 represent energy, in electron volts.

The performance of this variation on the design is distinctive in that the phase change in the vanadium dioxide causes a major perturbation to the optical mode spectrum allowed within the device. As a result, the lowest order photonic mode (TM1) is strongly "cutoff" and can no longer exist when the vanadium dioxide is switched from its insulating to metallic state. This is illustrated at the pair of points A and B. Point A represents the transmission of light having a free space wavelength of 1550 nanometers, propagating in the form of a TM1 mode. Note, that point B indicates the total absence of a TM1 mode in the solution. Points C and D illustrate the same effect at 1310 nanometers. This device can be used as an attenuation modulator with an on/off ratio of over 20 dB over a wide band in the infrared spectrum. The specific band can be tuned by varying the thickness of the passive insulating layers in the device. The modes of operation of this device are summarized in Table 3.

TABLE 3

| | Operating Point ($\lambda_o$) | Mode Type | Mode Index ($c*k_R/\omega$) | Quality Figure |
|---|---|---|---|---|
| A | 1550 nm | TM1 | 0.74 | 4.3 |
| B | 1550 nm | N/A | n/a (cutoff) | <0.01 |
| C | 1310 nm | TM1 | 1.13 | 14 |
| D | 1310 nm | N/A | n/a (cutoff) | <0.01 |

Figure 11:
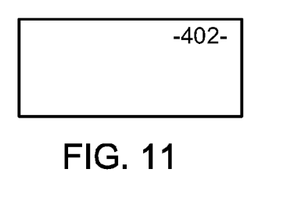
FIGS. 11-18 collectively illustrate a first example of a fabrication process for a waveguide in accordance with an aspect of the present invention.

FIGS. 11-18 illustrate a first example of a fabrication process for a waveguide in accordance with an aspect of the present invention. It is to be appreciated that the present example is discussed with respect to a four-layer switchable metal-insulator-metal (MIM) waveguide configured for near-infrared light and utilizing a solid-state phase change material, such as vanadium oxide, to provide the switching, but it will be appreciated that the methodology illustrated in these figures can be employed for forming a variety of different plasmonic modulation structures. FIG. 11 illustrates a waveguide structure in its early stages of fabrication. The waveguide structure includes a substrate 402 comprising an appropriate material for a high temperature fabrication process. For example, the substrate 402 can be formed from sapphire ($Al_2O_3$).

Figure 12:
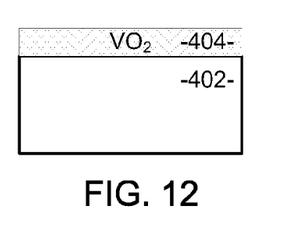

In FIG. 12, a layer of solid-state phase change material 404 is deposited over the substrate 402. In the illustrated implementation, the solid-state phase change material is vanadium oxide ($VO_2$). Any suitable technique for forming the layer of solid-state phase change material 404 may be employed such as Low Pressure Chemical Vapor Deposition (LPCVD), Plasma Enhanced Chemical Vapor Deposition (PECVD), Atomic Layer Deposition (ALD), sputtering or spin. In the illustrated implementation, the vanadium oxide 404 is deposited via Pulsed Laser Deposition (PLD). It will be appreciated that the thickness of the layer of solid-state phase change material 404 will vary with the desired optical properties of the waveguide and the wavelength of interest for modulation. In the illustrated implementation, the layer of solid-state phase change material 404 can have a thickness, for example, of about twenty nanometers to about two hundred nanometers.

Figure 13:
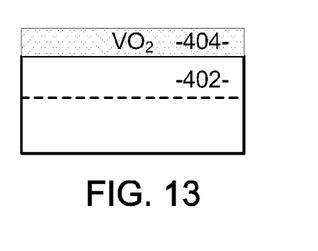
Figure 14:
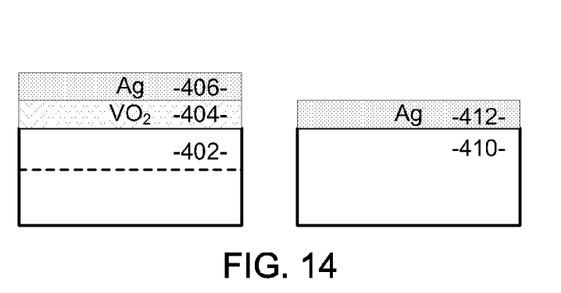

Next, as represented in FIG. 13, the substrate 402 is weakened, for example, via ion implantation. In FIG. 14, the substrate 402 and a second substrate 410 are each covered with respective plasmonic layers 406 and 412. The plasmonic layers 406 and 412 can include any material having appropriate reflectivity at the wavelength of interest. In the illustrated implementation, the plasmonic layers are 406 and 412 are formed from silver. The plasmonic layers 406 and 412 can be applied by any appropriate process for producing a thin, plasmonic film, for example, an evaporative deposition process.

Figure 15:
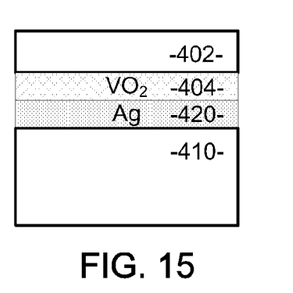

In FIG. 15, the two substrates 402 and 410 are bonded together at their plasmonic layers to form a composite assembly with a bonded plasmonic layer 420. In this process, the layers 402, 404, and 406 of the first substrate 402 are removed at the point of damage from the weakening depicted in FIG. 13 and transferred to the second substrate 410 via the metallic bonding. The remaining portion of the first substrate 402 is etched away at FIG. 16. The etch step can be performed via any of a variety of known dry etch or wet etch processes that employ an etchant which selectively etches the substrate 402, with the illustrated implementation using a wet etching approach appropriate for selectively removing aluminum oxide.

Figure 16:
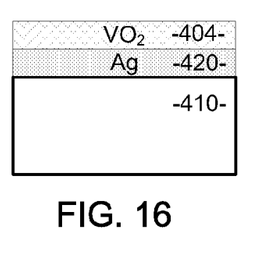
Figure 17:
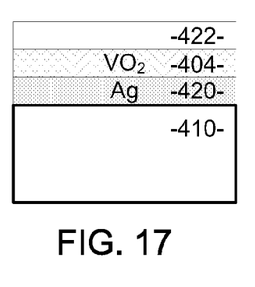
Figure 18:
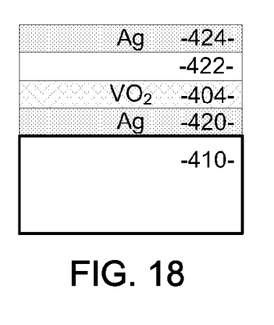

At FIG. 17, a dielectric layer 422 is deposited on the solid-state phase change material exposed by the etching step of FIG. 16. For example, the dielectric layer 422 can be formed from sapphire. Any suitable technique for forming the dielectric layer 422 may be employed such as Low Pressure Chemical Vapor Deposition (LPCVD), Plasma Enhanced Chemical Vapor Deposition (PECVD), Atomic Layer Deposition (ALD), sputtering or spin. In the illustrated implementation, the dielectric layer 422 is deposited via Polyatomic Layer Chemical Vapor Deposition (PLCVD). It will be appreciated that the thickness of the dielectric layer 422. In the illustrated implementation, the dielectric layer 422 can have a thickness, for example, of about two hundred nanometers to several microns. It will be appreciated that, where a three-layer MIM waveguide is desired, the deposition depicted in FIG. 17 can be omitted. At FIG. 18, the uppermost layer of the composite assembly, that is, the layer of solid-state phase change material 404 or the dielectric layer 422, depending on the desired implementation, is covered with a second plasmonic layer 424 to provide an upper layer of cladding for the waveguide. The second plasmonic layer 424 can be applied by any appropriate process for producing a thin, plasmonic film, for example, an evaporative deposition process.

Figure 19:
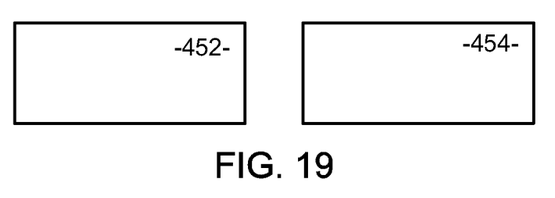
FIGS. 19-24 collectively illustrate a second example of a fabrication process for a waveguide in accordance with an aspect of the present invention.

FIGS. 19-24 illustrate a second example of a fabrication process for a waveguide in accordance with an aspect of the present invention. It is to be appreciated that the present example is discussed with respect to a three-layer switchable insulator-metal-insulator (IMI) waveguide configured for near-infrared light and utilizing a solid-state phase change material, such as vanadium oxide, to provide the switching, but it will be appreciated that the methodology illustrated in these figures can be employed for forming a variety of different plasmonic modulation structures. FIG. 19 illustrates a waveguide structure in its early stages of fabrication. The waveguide structure includes first and second substrates 452 and 454 comprising an appropriate material for a high temperature fabrication process. For example, the substrates 452 and 454 can be formed from sapphire ($Al_2O_3$).

Figure 20:
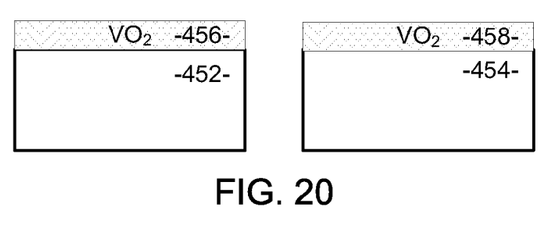

In FIG. 20, respective layers of solid-state phase change material 456 and 458 are deposited on each of the first and second substrates 454. In the illustrated implementation, the solid-state phase change material is vanadium oxide ($VO_2$). Any suitable technique for forming the layers of solid-state phase change material 456 and 458 may be employed such as Low Pressure Chemical Vapor Deposition (LPCVD), Plasma Enhanced Chemical Vapor Deposition (PECVD), Atomic Layer Deposition (ALD), sputtering or spin. In the illustrated implementation, the vanadium oxide is deposited via Pulsed Laser Deposition (PLD). It will be appreciated that the thickness of the layers of solid-state phase change material 456 and 458 will vary with the desired optical properties of the waveguide and the wavelength of interest for modulation. In the illustrated implementation, the layers of solid-state phase change material 456 and 458 can have thicknesses ranging, for example, from about twenty nanometers to about two hundred nanometers.

Figure 21:
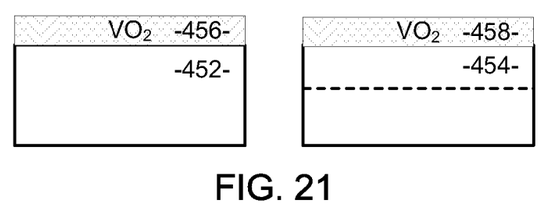
Figure 22:
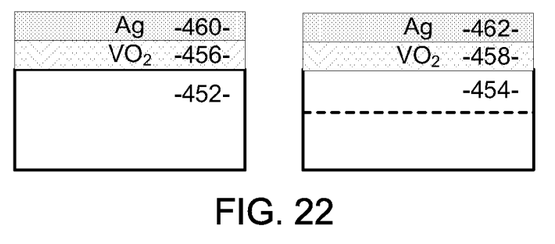

Next, as represented in FIG. 21, the second substrate 454 is weakened, for example, via ion implantation. In FIG. 22, the layers of solid-state phase change material 456 and 458 are each covered with respective plasmonic layers 460 and 462. The plasmonic layers 460 and 462 can include any material having appropriate reflectivity at the wavelength of interest. In the illustrated implementation, the plasmonic layers are 460 and 462 are formed from silver. The plasmonic layers 460 and 462 can be applied by any appropriate process for producing a thin, plasmonic film, for example, an evaporative deposition process.

Figure 23:
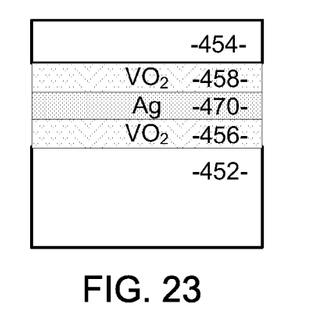
Figure 24:
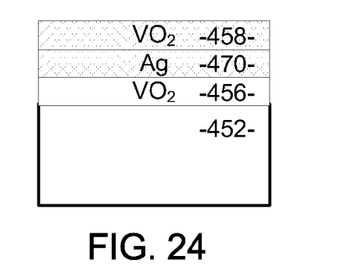

In FIG. 23, the two substrates 452 and 454 are bonded together at their plasmonic layers 460 and 462 to form a composite assembly with a bonded plasmonic layer 470. In this process, the layers 454, 458, and 462 of the second substrate 454 are removed at the point of damage from the weakening depicted in FIG. 21 and transferred to the second substrate 410 via the metallic bonding. The remaining portion of the second substrate 454 is etched away at FIG. 24 to provide the three-layer IMI waveguide. The etch step can be performed via any of a variety of known dry etch or wet etch processes that employs an etchant which selectively etches the substrate 454, with the illustrated implementation using a wet etching approach appropriate for selectively removing aluminum oxide.

It should be apparent to those of ordinary skill in the art that other solid-state phase change materials, other dielectric materials, and other metals or conductors might be substituted for the respective solid-state phase change, dielectric, and conductive layer materials from which a plasmonic modulator might be constructed, provided that suitable design changes were also applied, as has been explained herein. In one illustrated implementation, slits were opened in plasmonic cladding layers to provide source and drain openings, that is, an input optical terminal and an output optical terminal. However, other structures, such as waveguides, can be used to provide source and drain terminals. It is further contemplated that it could be possible to use an opening in a plasmonic layer as one of the source and drain, and a waveguide as the other of the source and drain in a device.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:

1. A nanoscale plasmonic modulator assembly for modulating light of a wavelength of interest comprising:
   a plasmonic layer that supports surface plasmon polaritons at the wavelength of interest;
   a layer of solid-state phase change material having a first phase in which it is substantially transparent to light of the wavelength of interest and a second phase in which it is substantially opaque to light of the wavelength of interest;
   a dielectric layer that is substantially transparent to light of the wavelength of interest; and
   a control mechanism configured to alter the phase of the solid-state phase change material between the first phase and the second phase;
   wherein each of the plasmonic layer and the layer of solid-state phase change material are configured as to provide a plasmonic mode of transmission for light of the wavelength of interest.

2. The nanoscale plasmonic modulator assembly of claim 1, wherein the dielectric layer is a first dielectric layer and the assembly further comprises a second dielectric layer, the layer of solid-state phase change material being positioned between the first dielectric layer and the second dielectric layer.

3. The nanoscale plasmonic modulator assembly of claim 2, wherein the plasmonic layer is a first plasmonic layer and the assembly further comprises a second plasmonic layer, the first dielectric layer being positioned between the first plasmonic layer and the layer of solid-state phase change material, and the second dielectric layer being positioned between the layer of solid-state phase change material and the second plasmonic layer.

4. The nanoscale plasmonic modulator assembly of claim 1, wherein the layer of solid-state phase change material is positioned between the plasmonic layer and the dielectric layer.

5. The nanoscale plasmonic modulator assembly of claim 4, wherein the plasmonic layer is a first plasmonic layer, and the assembly further comprises a second plasmonic layer, each of the layer of solid-state phase change material and the dielectric layer being positioned between the first plasmonic layer and the second plasmonic layer.

6. The nanoscale plasmonic modulator assembly of claim 1, wherein the layer of solid-state phase change material is a first layer of solid-state phase change material, and the assembly further comprises a second layer of solid-state phase change material, the plasmonic layer being positioned between the first layer of solid-state phase change material and the second layer of solid-state phase change material.

7. The nanoscale plasmonic modulator assembly of claim 1, wherein the layer of solid-state phase change material comprises a layer of vanadium oxide.

8. The nanoscale plasmonic modulator assembly of claim 7, wherein the control mechanism comprises circuitry configured to apply an electrical field to the vanadium oxide.

9. The nanoscale plasmonic modulator assembly of claim 1, wherein the layer of solid-state phase change material comprises a chalcogenide phase change film.

10. The nanoscale plasmonic modulator assembly of claim 1, wherein the control mechanism comprises an ultrafast optical pumping arrangement.

11. The nanoscale plasmonic modulator assembly of claim 1, wherein the control mechanism comprises thermal switching, via elements which heat or cool the layer of solid-state phase change material.

12. The nanoscale plasmonic modulator assembly of claim 1, wherein the dielectric layer, the plasmonic layer, and the layer of solid-state phase change material are configured to form a waveguide arrangement having at least one plasmonic mode.

13. A method for fabricating a nanoscale plasmonic modulator comprising:
   depositing a solid-state phase change material on a first substrate;
   depositing a first plasmonic layer on the solid-state phase change material, such that the solid-state phase change material is substantially covered by the first plasmonic layer;
   depositing a second plasmonic layer on a second substrate;
   bonding the first substrate to the second substrate, such that the first plasmonic layer is joined to the second plasmonic layer; and
   etching substantially all of the first substrate to expose the solid-state phase change material.

14. The method of claim 13, wherein depositing a solid-state phase change material on a first substrate comprises depositing the solid-state phase change material via pulsed laser deposition.

15. The method of claim 13, further comprising depositing a third plasmonic layer on the solid-state phase change material, such that the solid-state phase change material is substantially covered by the third plasmonic layer.

16. The method of claim 13, depositing a second layer of solid-state phase change material on the second substrate prior to depositing the second plasmonic layer, such that the second plasmonic layer substantially covers the second layer of solid-state phase change material.

17. The method of claim 13, further comprising:
   depositing an dielectric layer on the solid-state phase change material, such that the solid-state phase change material is substantially covered by the dielectric layer; and
   depositing a third plasmonic layer on the dielectric layer.

18. The method of claim 13, further comprising weakening the first substrate via ion implantation prior to bonding the first substrate to the second substrate.

19. A nanoscale plasmonic modulator assembly for modulating light of a wavelength of interest comprising:
   a plasmonic layer that is substantially opaque to light of the wavelength of interest;
   a dielectric layer that is substantially transparent to light of the wavelength of interest
   a layer of vanadium oxide; and a control mechanism configured to alter the phase of the vanadium oxide between a metallic phase and an insulator phase;

wherein each of the plasmonic layer, the dielectric layer, and the layer of vanadium oxide are configured as to provide a plasmonic mode of transmission for light of the wavelength of interest.

20. The nanoscale plasmonic modulator assembly of claim 19, wherein the dielectric layer is formed from sapphire and the plasmonic layer is formed from silver.

21. The nanoscale plasmonic modulator assembly of claim 19, wherein the dielectric layer is formed from sapphire and the plasmonic layer is formed from gold.

22. The nanoscale plasmonic modulator assembly of claim 19, wherein the dielectric layer is formed from silicon dioxide and the plasmonic layer is formed from silver.

23. The nanoscale plasmonic modulator assembly of claim 19, wherein the dielectric layer is formed from silicon dioxide and the plasmonic layer is formed from gold.

* * * * *